United States Patent
Keller et al.

(10) Patent No.: US 9,193,223 B2
(45) Date of Patent: *Nov. 24, 2015

(54) TIRE PRESSURE INDICATOR

(71) Applicant: GOODRICH CORPORATION, Charlotte, NC (US)

(72) Inventors: Steven Thomas Keller, Union, OH (US); Paul L. Summers, Troy, OH (US); Eric Daniel Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 61 days.

This patent is subject to a terminal disclaimer.

(21) Appl. No.: 14/184,020

(22) Filed: Feb. 19, 2014

(65) Prior Publication Data

US 2015/0231936 A1    Aug. 20, 2015

(51) Int. Cl.
*B60C 23/00* (2006.01)
*B60C 23/04* (2006.01)
*G01M 17/02* (2006.01)
*G08B 7/06* (2006.01)

(52) U.S. Cl.
CPC ........... *B60C 23/0447* (2013.01); *G01M 17/02* (2013.01); *G08B 7/06* (2013.01)

(58) Field of Classification Search
None
See application file for complete search history.

(56) References Cited

U.S. PATENT DOCUMENTS

| | | | | |
|---|---|---|---|---|
| 3,786,413 | A * | 1/1974 | Ross et al. | 340/443 |
| 4,723,445 | A * | 2/1988 | Ripley et al. | 73/146.3 |
| 5,335,541 | A * | 8/1994 | Sharpe | 73/146.5 |
| 2004/0075022 | A1* | 4/2004 | MacKness | 244/100 R |
| 2004/0124307 | A1* | 7/2004 | Mackness | 244/10 |
| 2005/0199328 | A1* | 9/2005 | Schoenberger et al. | 152/415 |
| 2006/0162437 | A1* | 7/2006 | Jard | 73/146.8 |
| 2008/0110250 | A1* | 5/2008 | Jones | 73/146 |
| 2010/0121504 | A1* | 5/2010 | Jones et al. | 701/16 |
| 2010/0256946 | A1* | 10/2010 | Carresjo et al. | 702/138 |
| 2012/0053784 | A1* | 3/2012 | Schmidt et al. | 701/33.4 |
| 2014/0067169 | A1* | 3/2014 | Hughes et al. | 701/3 |
| 2014/0297149 | A1* | 10/2014 | Gorczyca et al. | 701/70 |
| 2015/0005982 | A1* | 1/2015 | Muthukumar | 701/1 |

OTHER PUBLICATIONS

The Elephant in the Showroom, Ezra Dyer, The New York Times, Feb. 4, 2011.

* cited by examiner

*Primary Examiner* — Julie Lieu
(74) *Attorney, Agent, or Firm* — Snell & Wilmer, LLP

(57) ABSTRACT

System and methods for indicating a tire pressure condition are disclosed. Some systems and methods include receiving, by a control unit comprising a processor and a tangible, non-transitory memory, a tire pressure data, determining, by the control unit, a relationship of the tire pressure data to a predetermined tire pressure, and causing, by the control unit, an output device to display a value in accordance with the relationship, wherein the output device is externally located on an aircraft.

11 Claims, 7 Drawing Sheets

TIRE PRESSURE INDICATOR

FIELD

The present disclosure relates to indication methods and indication systems for inflation of tires.

BACKGROUND

Ground crews and pilots are expected to check the tire pressure of each tire at least daily and to ensure that the tire pressure meets a minimum predetermined tire pressure set by manufacturer's guidelines. However, conventional systems and methods either involve ground crews and pilots manually checking each tire individually with a separate tire pressure gauge.

SUMMARY

According to various embodiments, systems for indicating a tire pressure condition are provided comprising a processor and a tangible, non-transitory memory, wherein the processor is in at least one of electrical communication and radio frequency ("RF") communication with an output device, wherein the output device is externally located on an aircraft, wherein the processor is configured to receive a tire pressure data, wherein the processor is configured to determine a relationship of the tire pressure data to a predetermined tire pressure, and wherein the processor is configured to cause the output device to display a value in accordance with the relationship are disclosed.

Also disclosed are various methods of indicating a tire pressure condition, comprising receiving, by a control unit comprising a processor and a tangible, non-transitory memory, a tire pressure data; determining, by the control unit, a relationship of the tire pressure data to a predetermined tire pressure; and causing, by the control unit, an output device to display a value in accordance with the relationship, wherein the output device is externally located on an aircraft.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice various embodiments disclosed herein, it should be understood that other embodiments may be realized and that logical, electrical and mechanical changes may be made without departing from the spirit and scope of this disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. As used herein, phrases such as "make contact with," "coupled to," "touch," "interface with" and "engage" may be used interchangeably.

Figure 1:
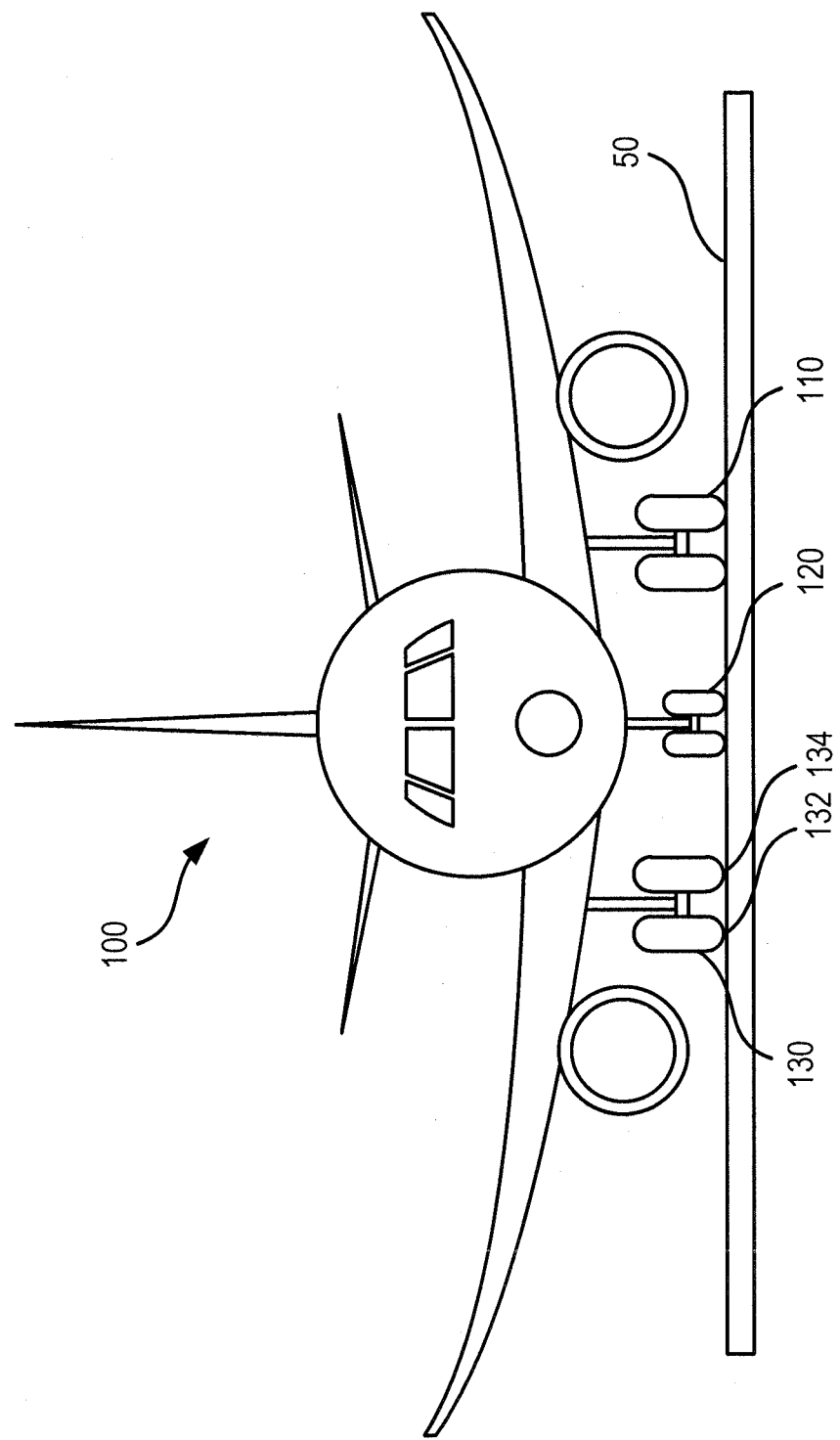
FIG. 1 illustrates, in accordance with various embodiments, a front view of an aircraft on the ground.
Figure 2:
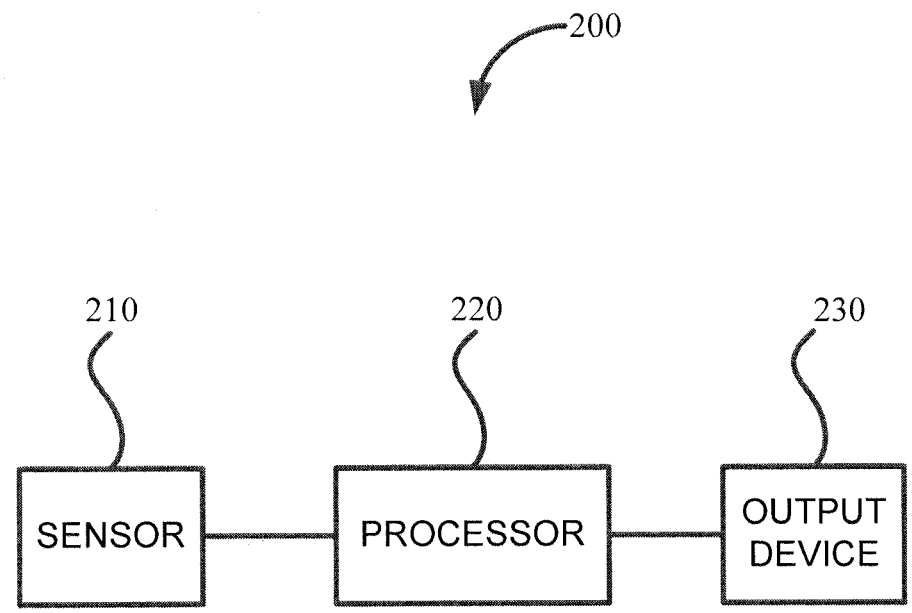
FIG. 2 illustrates various components of an indication system for the inflation of tires, in accordance with various embodiments.

With reference to FIG. 1, a front view of an aircraft 100 on ground 50 is illustrated according to various embodiments. Aircraft 100 may comprise landing gear including left main landing gear ("LMLG") 110, nose landing gear ("NLG") 120, and right main landing gear ("RMLG") 130. Though a t-gear type landing gear aircraft is depicted, it should be appreciated that the concepts described herein are applicable to aircraft having multiple axle pairs per gear and aircraft with more than three gears. Each gear may comprise one to six wheels or more than six wheels (e.g., military transport aircraft). For example, RMLG 130 comprises right outboard wheel 132 and right inboard wheel 134. However, in various embodiments, aircraft 100 may comprise any number of landing gears and each landing gear may comprise any number of wheels. Additionally, the concepts disclosed herein variously apply to aircraft with other numbers of wheels (e.g. one wheel for each main landing gear). In various embodiments, an aircraft may comprise a tire inflation indication system. With reference to FIG. 2, tire inflation indication system 200 may comprise a sensor 210, a processor 220, and an output device 230. In various embodiments, sensor 210 may be part of a tire pressure monitor system ("TPMS"). In various embodiments, a processor 220 is in electrical communication and/or radio frequency (RF) communication and/or another form of wireless communication with sensor 210 to process data provided by the sensor 210. In various embodiments, the processor 220 is in electrical communication and/or RF communication and/or another form of wireless communication with an output device 230.

In various embodiments, output device 230 can provide a human readable and/or machine readable output based upon the data provided by processor 220. In various embodiments, the output device 230 may comprise activating an indicator light (e.g., a light-emitting diode ("LED")) on or around the landing gear 130, an indicator light on or around each individual tire (e.g., 132 and 134), an indicator light on or around each individual tire pressure sensor, a mechanically actuated indicator on or around the landing gear, a mechanically actuated indicator on or around each individual tire, and/or an audible display (e.g., repeated actuation of the brakes).

Figure 7:
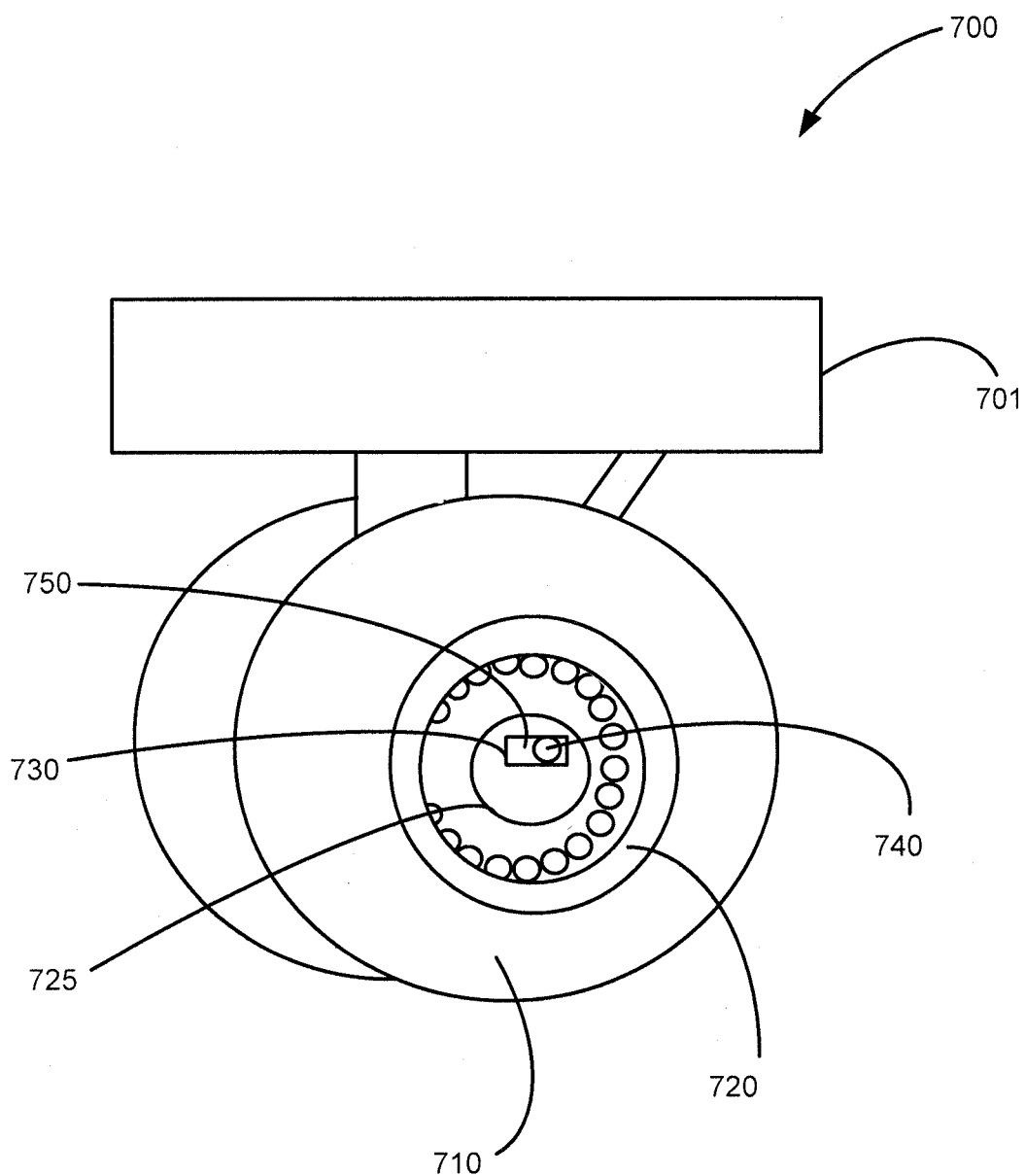
FIG. 7 illustrates a portion of an aircraft comprising an indication system for the inflation of tires according to various embodiments.

For example, with temporary reference to FIG. 7, a portion of an aircraft comprising an indication system for the inflation of tires according to various embodiments is illustrated. Portion of an aircraft 700 may comprise gear bay 701, tire 710, and wheel 720. Wheel 720 may comprise hubcap 725 which may comprise indication system 730. According to various embodiments, indication system 730 may be externally located on the aircraft. Indication system 730 may comprise an electrical source (e.g., a battery 750) in electrical communication with LED light 740.

Figure 3:
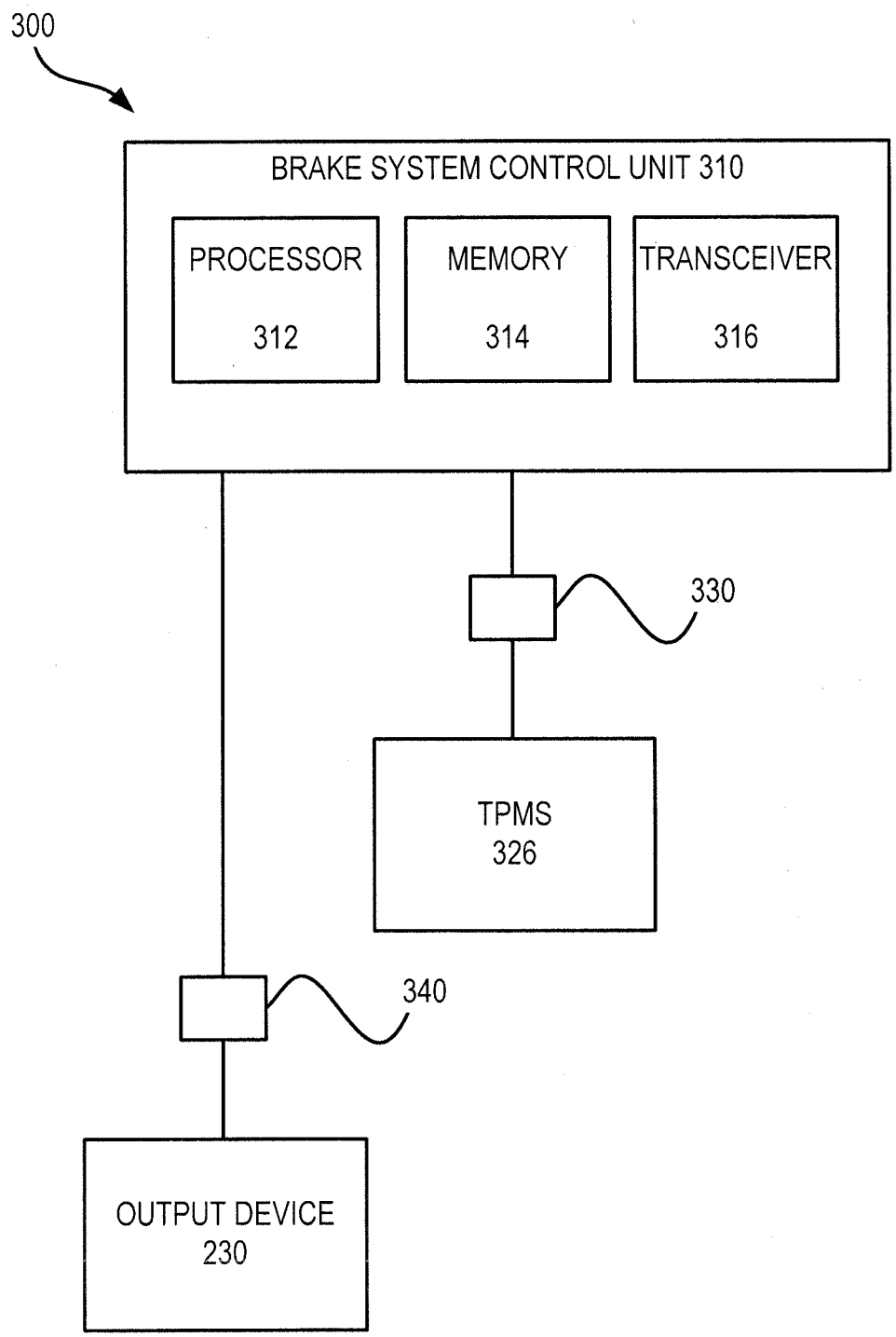
FIG. 3 illustrates a brake control unit, in accordance with various embodiments.

Accordingly, in some embodiments, the inflation indication mechanism may comprise a control unit, such as a brake system control unit ("BSCU"). With reference to FIG. 3, FIG. 3 illustrates a tire inflation indication system 300 comprising a BSCU 310. In various embodiments, BSCU 310 may comprise a processor 312, a tangible, non-transitory memory 314, and a transceiver 316. According to various embodiments, BSCU 310 may be in electrical communication with tire pressure monitoring system 326 via electrical connection 330. In various embodiments BSCU 310 may be in electrical communication with output device 230 via electrical connection 340 and, in various embodiments, output device may be powered by BSCU 310.

Figure 4:
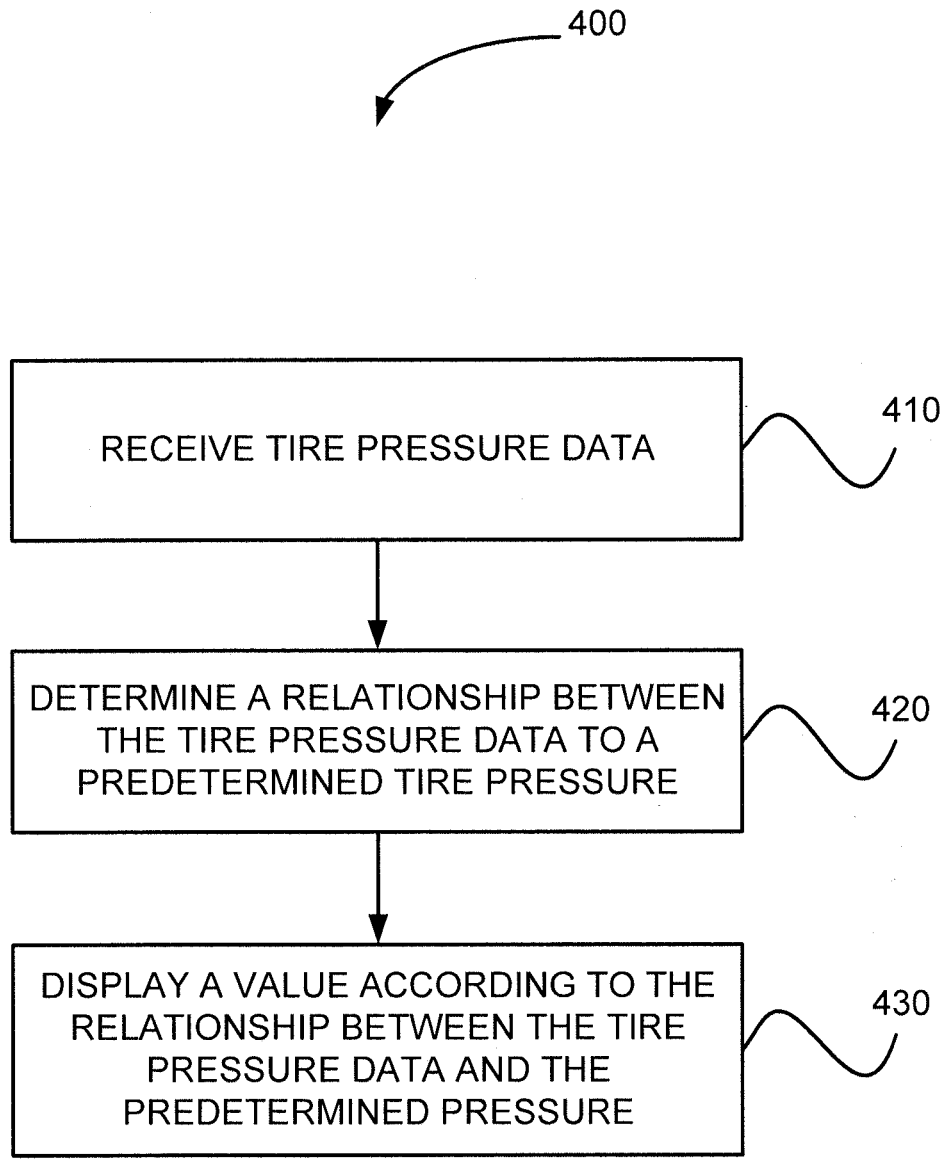
FIG. 4 illustrates a logical flowchart of various indication methods and/or systems, in accordance with various embodiments.

FIG. 4 illustrates method 400, which is an indication method and/or the steps performed by an indication system for determining the relationship of a tire pressure data to a predetermined tire pressure as may be performed according to various embodiments. As used herein, the term "tire pressure data" may include any data indicating the pressure of a tire. For example, according to various embodiments, tire pressure data may include data provided by a TPMS.

As used herein, the term "predetermined tire pressure" and "predetermined pressure" may be used interchangeably and according to various embodiments, may include any tire pressure selected before receiving tire pressure data. For example, predetermined tire pressure may include a maximum or minimum tire pressure set by a manufacturer of a tire, an operating pressure specified by an aircraft operator, or any other pressure to which the relationship of the tire pressure data may be determined. In various embodiments, the predetermined pressure may be altered, for example, in the event the tire is changed or manufacturer specifications change. A processor may receive tire pressure data (step 410), for example from a pressure sensor and/or a TPMS. The tire pressure data may then be compared, for example using a processor (e.g., a processor forming part of a BSCU), with a predetermined pressure to determine a relationship between the tire pressure data and the predetermined tire pressure (step 420). For example, according to various embodiments, the relationship may be whether the tire pressure data exceeds a predetermined tire pressure, whether the tire pressure data is less than the predetermined tire pressure, whether the tire pressure data is within a range of predetermined tire pressures. After the determination of the relationship, a value according to the relationship between the tire pressure data and the predetermined pressure are displayed, for example with an output device (step 430).

As used herein, the term "displayed" may include, according to various embodiments, a visual display and/or an audio display. Exemplary visual displays of an output device according to various embodiments, include an indicator light (e.g., a light-emitting diode ("LED")) on or around the landing gear, an indicator light on or around each individual tire, an indicator light on or around each individual tire pressure sensor, a mechanically actuated indicator on or around the landing gear, a mechanically actuated indicator on or around each individual tire, and/or an audible display (e.g., repeated actuation of the brakes).

According to various embodiments, the output device may be externally located on an aircraft. As used herein the term "externally located on an aircraft" includes any external location on a parked aircraft. For example, according to various embodiments, an output devise located on the landing gear or gear bay of an aircraft would be considered to be externally located on the aircraft even though the landing gear may be retracted and internally stored in the aircraft during flight.

Exemplary values from output devices according to various embodiments include a visual indication, such as a light or mechanical indicator, which may be positioned externally on the aircraft, such as at least one of on the tire pressure sensor, on the hubcap of a wheel, a cap in communication with a wheel, and elsewhere on the landing gear of an aircraft (e.g., the gear bay). In various embodiments the output device is capable of audibly displaying whether the tire pressure does not meet minimum tire pressure specifications, such as repeated actuation of the brakes. In various embodiments, the display may be color coded or may include symbols and/or words.

For example, according to various embodiments, the color red may indicate that relationship between the tire pressure data and the predetermined tire pressure are not in accordance with manufacturer specifications (e.g., the tire pressure data is below a minimum tire pressure). In various embodiments, the output device could be a celluloid flag, disk, or other mechanical indication. According to various embodiments the mechanical indication could be color coded or color coded or may include symbols and/or words.

As used herein, the term "display" may indicate the presence or absence of a determination. For example, in various embodiments, the indication that tire pressure data exceeds a predetermined tire pressure may comprise an absence of an inappropriate display. For example, in various embodiments, a display that the tire pressure data exceeds a predetermined tire pressure may be sent to an output device. The output device may comprise an indicator light that turns on in response to an indication that the tire pressure data does not exceed a predetermined tire pressure and off in response to an indication that the tire pressure data exceeds a predetermined tire pressure.

As yet another example, in various embodiments, the indication that the tire pressure data exceeds a predetermined tire pressure may comprise a presence of an appropriate display. For example, in various embodiments, a display that the tire pressure data exceeds a predetermined tire pressure may be sent to an output device. The output device may comprise an indicator light that turns on in response to an indication that the tire pressure data exceeds a predetermined tire pressure and off in response to an indication that the tire pressure data does not exceed a predetermined tire pressure.

Moreover, in various embodiments, energy may be stored in the output device to allow for the display of the value when power is not being supplied by the aircraft or ground power. For example, in various embodiments, the output device may be in electrical communication with a battery that, in various embodiments, may be capable of being recharged, such as through solar power, auxiliary power, or other charging device.

According to various embodiments, an audible display may be an audible sound, such as the actuation of the brakes repeatedly. To prevent unwanted braking while the aircraft is moving, embodiments that include actuating the brakes may contain automatic override protocols. For example, the BSCU may contain logic which prevents actuating the brakes as an output until the parking brake is engaged or the aircraft engines are turned off.

Figure 5:
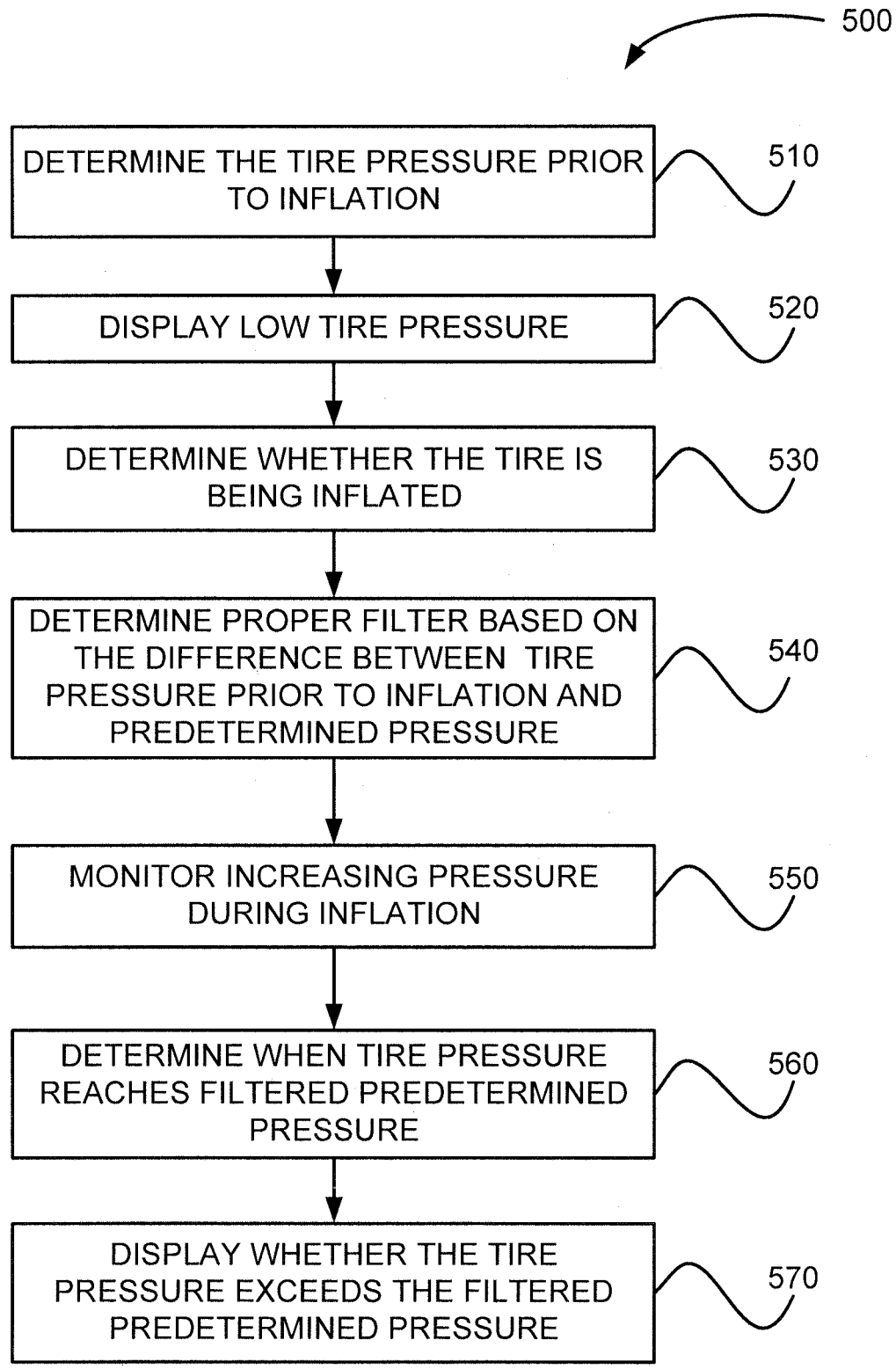
FIG. 5 illustrates a logical flowchart of various indication methods and/or systems, in accordance with various embodiments.

FIG. 5 illustrates an exemplary method 500 as may be performed by an inflation indication method and/or the steps performed by an indication system for determining the relationship of a tire pressure data to a predetermined pressure during the inflation of a tire. With temporary reference to FIG. 4, once the value according to the relationship between the tire pressure data and the predetermined pressure are displayed (step 430), the tire pressure prior to inflation may be determined (step 510) and a low tire pressure value may be indicated by the system (step 520). According to various embodiments, the system may, continue to monitor the tire pressure to determine whether the tire is being inflated (step 530). Once inflation of the tire commences, the system, such as the BSCU, may then determine the proper filter based on the difference between the tire pressure prior to inflation and the predetermined pressure (step 540). For example, according to various embodiments, the filter could be a value based on experimental data (e.g., data based on the maximum natural rate of increase in tire pressure). According to various embodiments, the filter can vary according to the location of the sensor in relation to a port on the tire such as the inflation port, the over inflation port, and the spare port. In various embodiments, the system can then monitor the increase in tire pressure during inflation (step 550) until the tire pressure reaches the filtered predetermined pressure (step 560). Once, the tire pressure exceeds the filtered predetermined pressure, a display whether the tire pressure exceeds the filtered predetermined tire pressure may be given (step 570).

As used herein, the term "filter" or "filtering" may include any adjustment to received tire pressure data or the predetermined tire pressure. In various embodiments, tire pressure data may be filtered by the control unit, such as during the inflation of a tire to account for surges in tire pressure measurements during inflation or phase lags. For example, measuring tire pressure during or shortly after inflation may result in tire pressure data that may be several pounds higher than the actual tire pressure.

Accordingly, in various embodiments, the processor may contain logic to determine when the application of a filter is appropriate. For example, in various embodiments, the processor may be contain logic identifying when the tire is being inflated and, thus, may apply a filter to account for any surges in tire pressure data due to the inflation of the tire if desired. For example, according to various embodiments, a filter may be applied if the sensor is near an inflation port. Therefore, in various embodiments, systems and methods incorporating a filter may allow for more accurate inflation of tires without requiring maintenance personnel to wait before obtaining tire pressure data. In various embodiments, the filter may also account for variation of surges due to varying tire specifications. For example, some conventional nose gear tires are smaller than main landing gear tires. Accordingly, in various embodiments, the processor (e.g., a processor in a BSCU) may apply a separate filter for the nose gear tire than for the tires of the main landing gears.

Figure 6:
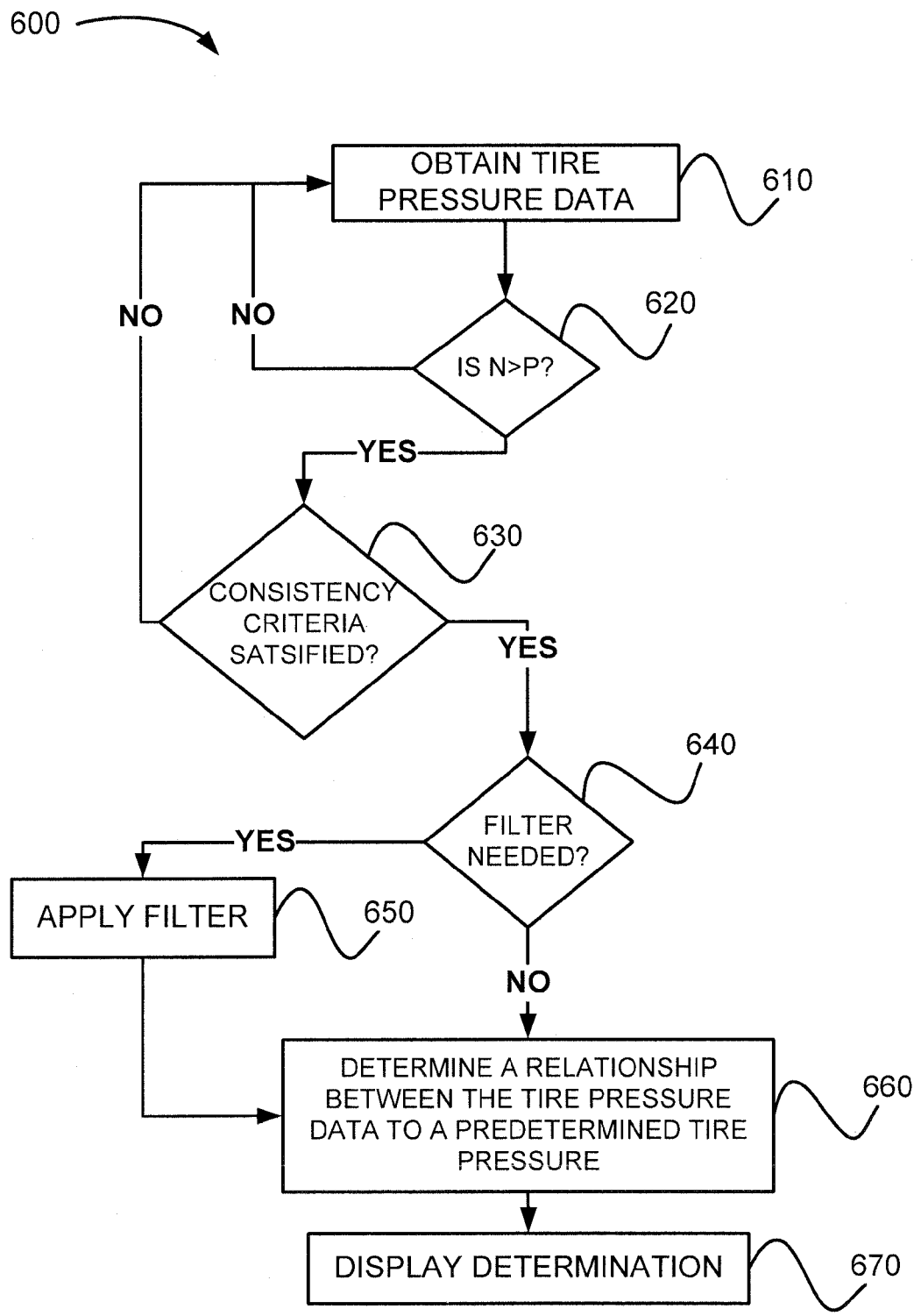
FIG. 6 illustrates a logical flowchart of various indication methods and/or systems, in accordance with various embodiments.

With reference to FIG. 6, FIG. 6 illustrates a logical flowchart of various indication method and/or the steps performed by an indication system for determining the relationship of a tire pressure data to a predetermined pressure, in accordance with various embodiments. Systems according to various embodiments may be configured to implement a hysteresis feature before indicating whether the tire pressure is over a predetermined pressure. In various embodiments, the incorporation of a hysteresis feature may prevent systems and methods from turning repeatedly on and off when the tire pressure is near the predetermined pressure. For example, various systems may include processes such as hysteresis method 600.

Hysteresis method 600 may comprise obtaining tire pressure data (step 610). The system may then determine if a number of pressure samples ("N") is greater than a predetermined number of tire pressure samples ("P"). When N<P, step 610 may be repeated until N>P as determined by the system in step 620. Then, in various embodiments, the system may determine whether a consistency criterion regarding measured tire pressures is satisfied (step 630).

As used herein, the term "consistency criteria" or "consistency criterion" may include any precedent condition to indicate that a display regarding the tire pressure should be given. In various embodiments, by having systems and methods incorporating consistency criteria, repeated fluctuations of displays may be avoided. For example, consistency criteria may include determining whether an average of the predetermined number of tire pressure samples is above, below, or equal to the predetermined pressure. In various embodiments, consistency criteria may be capable of accounting for inflation of tires or changes in the tire conditions (e.g., the cooling of tires).

After the consistency criterion is satisfied in step 630, systems may then determine whether a filter is to be applied (step 640). For example, as previously described, the processor may be configured to determine whether a filter should be applied, such as during the inflation of a tire to account for a tire pressure surge. Systems according to various embodiments may apply the filter (step 650) after which a determination of the relationship of the tire pressure data to a predetermined pressure may be made (step 660) using the applied filter from step 650. In various embodiments, where no filter is to be applied, the system may determine the tire pressure data to a predetermined pressure (step 660). After a determination is made, the processor may cause the output device to display a value in accordance with the relationship (step 670).

As used herein the term "cause the output device to display a value" may include directly causing the output device to display a value or indirectly causing the output device to display a value. For example, the processor may indirectly cause the output device to display a value by signaling another processor to activate the communication logic for output device.

In various embodiments, methods 400, 500, and/or 600 may be continuously repeated, may repeat after an interval of time (e.g., every 30 seconds), may be manually controlled (e.g., by maintenance personnel), and/or may be started after a particular event (e.g., extension of the landing gear).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of embodiments encompassed by this disclosure. The scope of the claimed matter in the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. §112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for indicating a tire pressure condition comprising:
   a processor and a tangible, non-transitory memory, wherein the processor is in electrical communication with an output device, wherein the output device is externally located on an aircraft,
   wherein the processor is configured to receive a tire pressure data,
   wherein the processor is configured to determine a relationship of the tire pressure data to a predetermined tire pressure,
   wherein the processor is configured to cause the output device to display a binary value in accordance with the relationship,
   wherein the output device is located on at least one of a hubcap of a wheel, a landing gear of the aircraft and a gear bay of the aircraft, and
   wherein the output device comprises at least one of an indicator light and a light-emitting diode ("LED").

2. The system according to claim 1, further comprising a battery in electrical communication with the output device.

3. The system according to claim 1, wherein the processor is part of a brake system control unit ("BSCU") and the output device is in electrical communication with the BSCU and the output device is powered by the BSCU.

4. The system according to claim 1, wherein the processor is configured to implement a hysteresis feature.

5. A method of indicating a tire pressure condition, comprising:
   receiving, by a control unit comprising a processor and a tangible, non-transitory memory, a tire pressure data;
   determining, by the control unit, a relationship of the tire pressure data to a predetermined tire pressure; and
   causing, by the control unit, an output device to display a binary value by activating a light-emitting diode ("LED") in accordance with the relationship, wherein the output device is located on at least one of a hubcap of a wheel, a landing gear of the aircraft and a gear bay of the aircraft.

6. The method according to claim 5, further comprising filtering, by the control unit, the tire pressure data.

7. The method according to claim 5, wherein the determining comprises determining whether the tire pressure data exceeds the predetermined tire pressure.

8. The method according to claim 7, wherein the displaying is performed during inflation of a tire.

9. The method according to claim 8, wherein the displaying comprises activating an audible display.

10. The method according to claim 9, wherein the control unit is a brake system control unit ("BSCU") and the audible display is performed by actuating a brake with the BSCU.

11. A system for indicating a tire pressure condition comprising:
    a housing, wherein a processor and a tangible, non-transitory memory is mounted within the housing;
    a light-emitting diode ("LED") mounted to the housing and in electrical communication with the processor;
    a battery in electrical communication with the processor and the LED;
    a pressure sensor coupled to the housing, in electrical communication with the processor, and configured to measure a tire pressure data;
    wherein the processor is configured to receive the tire pressure data,
    wherein the processor is configured to determine a relationship of the tire pressure data to a predetermined tire pressure,
    wherein the processor is configured to cause the LED to display a binary value in accordance with the relationship, and
    wherein the LED is located on at least one of a hubcap of a wheel, a landing gear of the aircraft and a gear bay of the aircraft.

* * * * *